(No Model.)
H. B. FURNESS.
PURIFYING WATER.
No. 577,806. Patented Feb. 23, 1897.
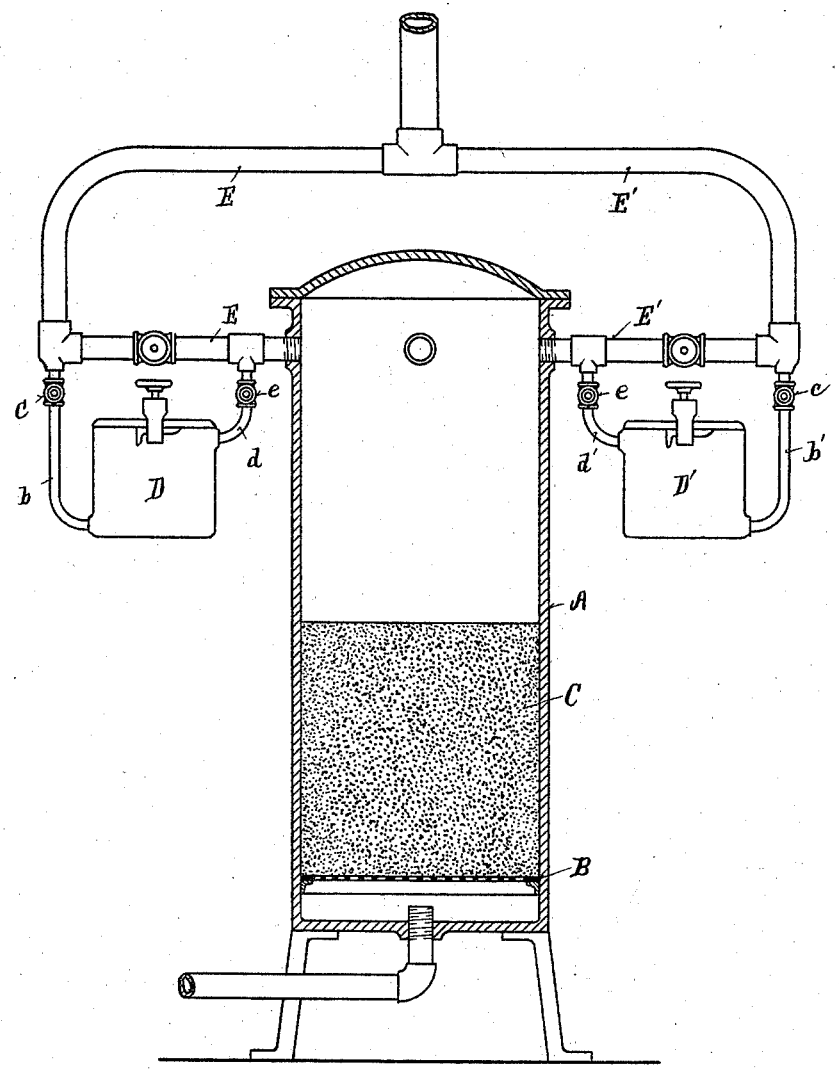
Witnesses
C. W. Miles.
Oliver B. Kaiser.
Inventor
Henry B. Furness.
By Wood Boyd
Attorneys

UNITED STATES PATENT OFFICE.

HENRY B. FURNESS, OF CINCINNATI, OHIO, ASSIGNOR TO FRED C. WEIR, OF SAME PLACE.

PURIFYING WATER.

SPECIFICATION forming part of Letters Patent No. 577,806, dated February 23, 1897.

Application filed October 20, 1894. Serial No. 526,501. (No specimens.)

*To all whom it may concern:*

Be it known that I, HENRY B. FURNESS, residing at Cincinnati, in the county of Hamilton and State of Ohio, have invented certain new and useful Improvements in Methods of Forming Filters and Purifying Water, of which the following is a specification.

My invention relates to the preparation and use of a filter-bed and to a method of purification of water by the removal therefrom of insoluble matter held in suspension, such as comminuted clay, silt, &c., and incidentally also a portion of such dissolved matter as may be reduced to an insoluble form in the manner hereinafter described. To effect this purpose I prepare a filter-bed as follows:

A bed of sufficiently fine sand or other granular material inclosed in a convenient vessel of suitable dimensions is provided. Upon the surface of this bed and to some extent penetrating the same I deposit in the manner hereinafter described an insoluble precipitate of a flocculent flexible nature whose particles are larger than the interstices between the sand grains and whose consistence is such as to cause it to adhere with considerable tenacity to the sand. By this means the interstitial spaces or pores of the sand-bed are filled or partially filled by the particles of the precipitate, so that said spaces or pores are of lesser dimensions than those of the particles suspended in the water. Water moving through such a medium will necessarily be deprived of all the suspended matter which it may contain and by reason of the flexible nature of the precipitate will flow freely with little diminution of velocity.

I employ any well-known granular filter apparatus, one form of which is shown in the accompanying drawing, making a part of this specification, in which the drawing is a central vertical section of a sand-filter cylinder with the chemical-tanks and their connections shown in elevation.

A represents the body of the filter. B represents the strainer. C represents the granular filtering medium resting thereon, which is preferably sand or powdered charcoal or other similar filtering media.

D D' represent chemical tanks connected to the branch supply-pipe E E' by pipes $b$ $d$ $b'$ $d'$. $c$ $e$ represent valves in the pipes connecting said tanks with the main supply-pipes, whereby a solution of the contents of the tanks may be passed into the filter with the water passed through said pipes.

In the tanks D D', I place soluble chemicals which, being dissolved by the water flowing through them, enter the cylinder simultaneously, and there meeting form by chemical reaction an insoluble adhesive flocculent precipitate whose particles are of larger dimensions than the interstices between the grains of sand which form the basis of the filter-bed. Water flowing through the bed so prepared is deprived of any sediment, such as silt, or any other finely-divided solid matter which may be suspended in it.

The chemical agents which I employ are preferably ferric or ferrous chlorid and an alkaline phosphate, preferably commercial phosphate of soda; but any soluble salt whose base is capable of forming an insoluble phosphate may be used instead of the iron salt, and an acid in connection with an alkali or sodium biborate instead of the sodium phosphate. The two solutions being carried simultaneously with each other and with the water-supply into the space above the sand in the iron cylinder rapidly react upon each other and form an insoluble, flexible, and adhesive precipitate, which covers the surface of the sand and to some extent penetrates the same. The reaction when ferric chlorid and disodium hydrogen phosphate are used is as follows:

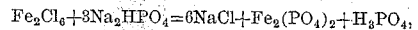
$$Fe_2Cl_6 + 3Na_2HPO_4 = 6NaCl + Fe_2(PO_4)_2 + H_3PO_4,$$

or ferric chlorid and disodium hydrogen phosphate give sodium chlorid, ferric phosphate, and orthophosphoric acid. If the water to be purified contains a calcium or magnesium salt in solution, a portion of both of them may be converted into insoluble phosphates by the excess of phosphoric acid and removed in the process of filtration. Practically all of the calcium and magnesium could be removed by putting in sufficient phosphoric acid to convert them into phosphates, but in water purified for domestic use it is desirable not to have an excess of phosphoric acid remaining in the solution, and so a lesser amount is used. It will be seen that by this method employed the reduction of the chemicals used is entirely independent of anything already contained in the water, and that the amount of precipitate required to form the filter-bed can be regulated irrespective of any kind or quantity of impurities, such as ammonia, alkalies, or lime or magnesia. This insures a uniform filter-bed and furnishes a certain, invariable, and complete filtration at all times. In addition the filter-bed being once prepared, as herein stated, retains its filtering quality without the introduction of additional reagents until by cleansing or the natural wear of the flowing water through it it requires renewal. This involves the use of very small quantities of the reagents. It will also be seen that this process does not coagulate the impurities, but on the other hand provides a filter-bed of sufficient fineness to intercept the finest particles of undissolved matter without coagulation of such matter. The supply of chemicals may be so regulated that if the water contains but a small quantity of lime or magnesia salts the only resultant of the reagents passed into the water in the process of purification and remaining in the filtered water is an extremely dilute solution of common salt.

I claim—

1. The method of forming a filter-bed in a filter, which consists in impregnating a granular bed with a flocculent, flexible and adhesive precipitate formed by the reaction of an alkaline phosphate upon a soluble salt the base of which forms said precipitate, substantially as specified.

2. The method of removing from water the suspended impurities in a filter containing a granular bed by introducing into the space above said granular bed a solution of an alkaline phosphate and a solution of any salt whose base is capable of forming with the said alkaline phosphate, an insoluble flocculent phosphate precipitate, said precipitate forming with the granular bed a filter upon which are deposited the suspended impurities during the passage of the water through the same, substantially as specified.

In testimony whereof I have hereunto set my hand.

HENRY B. FURNESS.

Witnesses:
W. R. WOOD,
E. E. WOOD.